United States Patent
Erdmenger et al.

(10) Patent No.: US 7,836,234 B2
(45) Date of Patent: Nov. 16, 2010

(54) COMMUNICATION IN ACCORDANCE WITH A MASTER-SLAVE COMMUNICATION PROTOCOL

(75) Inventors: Stefan Erdmenger, Augsburg (DE); Berndt Gammel, Markt-Schwaben (DE); Josef Riegebauer, Ilz (AT); Till Winteler, Munich (DE)

(73) Assignee: Infineon Technologies AG, Neubiberg (DE)

( * ) Notice: Subject to any disclaimer, the term of this patent is extended or adjusted under 35 U.S.C. 154(b) by 183 days.

(21) Appl. No.: 11/958,511

(22) Filed: Dec. 18, 2007

(65) Prior Publication Data

US 2008/0177915 A1    Jul. 24, 2008

(30) Foreign Application Priority Data

Dec. 19, 2006    (DE) .................... 10 2006 060 081

(51) Int. Cl.
 *G06F 13/00* (2006.01)
 *G06F 3/00* (2006.01)
 *G06F 1/00* (2006.01)

(52) U.S. Cl. .................. 710/110; 710/15; 710/104; 713/324

(58) Field of Classification Search .......... 710/106, 710/110
 See application file for complete search history.

(56) References Cited

U.S. PATENT DOCUMENTS

| | | | |
|---|---|---|---|
| 7,069,476 B1 * | 6/2006 | Insley et al. ................ | 714/43 |
| 7,143,215 B2 * | 11/2006 | Dunstan et al. ............ | 710/104 |
| 2003/0128111 A1 | 7/2003 | Sano et al. | |
| 2003/0165152 A1 | 9/2003 | Mills et al. | |
| 2004/0208200 A1 * | 10/2004 | Hejdeman et al. .......... | 370/476 |
| 2007/0038879 A1 * | 2/2007 | D'Angelo et al. .......... | 713/500 |
| 2008/0104422 A1 * | 5/2008 | Mullis et al. ............... | 713/300 |

OTHER PUBLICATIONS

Compaq et al.; "Universal Serial Bus Specification"; Apr. 27, 2000; Revision 2.0; i-274.*
Compaq et al.; "Universal Serial Bus Specification"; Apr. 27, 2000; Revision 2.0; pp. 275-622.*
Tanenbaum, Andrew S.; "Structured Computer Organization"; Prentice-Hall, Inc.; 1990; Third Edition; pp. 11-13.*
ETSI SCP TDOC Smart cards; UICC-CLF interface; Physical and logical characteristics (Release 7).

* cited by examiner

*Primary Examiner*—Ryan M Stiglic
(74) *Attorney, Agent, or Firm*—Dickstein Shapiro LLP

(57) ABSTRACT

A communication apparatus for communication according to a master-slave communication protocol is formed as a slave instance communicating with a master instance via a bus. The master instance is operative to switch the bus into a bus suspend state if no bus activity is present during a predetermined interval. In response to a bus suspend state, the slave instance makes a transition to a slave suspend state. The communication apparatus includes a monitor configured to monitor the bus activity and a transmitter configured to transmit a signal via the bus if the monitor does not recognize any bus activity during part of the predetermined interval and a transition of the slave instance to the slave suspend state is undesirable, wherein the signal is operative to prevent the master instance from switching the bus into the bus suspend state.

22 Claims, 2 Drawing Sheets

COMMUNICATION IN ACCORDANCE WITH A MASTER-SLAVE COMMUNICATION PROTOCOL

CROSS-REFERENCE TO RELATED APPLICATION

This application claims priority from German Patent Application No. 102006060081.9, which was filed on Dec. 19, 2006, and is incorporated herein in its entirety by reference.

TECHNICAL FIELD

The present invention relates to a communication apparatus in a master-slave communication scenario, such as occurring in the area of the smartcards or memory cards communication.

BACKGROUND

So-called Universal Integrated Circuit Cards (UICCs) are deployed in mobile phones, for example, and particularly, in mobile radio terminals corresponding to the GSM (GSM=Global System for Mobile Communication) or the UMTS (UMTS=Universal Mobile Telecommunication System) standard. Personal data of a mobile radio user, for example, are stored on such cards, wherein the integrity and the security of these data should be ensured. Typically, these cards store some hundred kilobytes, and experience has shown that the storage capacity will be expanded in the future.

Further, various applications may be stored on UICCs, such as the SIM application (SIM=Subscriber Identity Model), as used in GSM, or the USIM (USIM=Universal Subscriber Identity Module), as deployed in UMTS. A further application would be the ISIM (ISIM=IP Multimedia Services Identity Module), for example, such as may be deployed in IMS (IMS=IP Multimedia Subsystem). Various protocols are known in the conventional technique to read out data from such cards, which, for example, also permit to allow a communication between the card itself and a further interface, such as the CLF (CLF=Connection Less Front end).

One of these protocols is the SWP (SWP=Single Wire Protocol) known in the conventional technique. SWP enables communication in a master-slave scenario. In a case, for example, in which a master instance (e.g. a card reader) has "triggered" a data processing in the slave instance (e.g. a smart card), it may occur that after this "triggering", at first no further data exchange takes place between the slave instance and the master instance until the data processing, e.g. a calculation, is completed and provides data for transmission to the slave instance. In this case it may occur, due to the particularities of the protocol used, e.g. SWP, that the master instance places the bus at the suspend state due to the lack of communication, which leads to the slave instance being "turned off" and the calculation being cancelled. In this case, the processing triggered is not completed and may have to be performed again, or leads to errors.

In the case of the SWP, the slave instance automatically changes into the idle state if no activity has been watched on the SWP bus for longer than 8 bits. This state may be a state without energy, for example, in which no further signal processing takes place. In this context, it may occur that the slave instance at this point of time is not yet ready to enter the idle state which, according to the example above, may have an unfavorable effect on the delays in the data transmission.

SUMMARY

According to one embodiment, the present invention includes a communication apparatus for communication after a master-slave communication protocol, with the communication apparatus being formed as a slave instance communicating with a master instance via a bus. In this context, the master instance is operative to switch the bus into a bus suspend state if no bus activity is present during a predetermined interval. In response to a bus suspend state, the slave instance makes a transition to a slave suspend state. The communication apparatus includes a monitor configured to monitor the bus activity and a transmitter configured to transmit a signal via the bus if the monitor does not recognize any bus activity during part of the predetermined interval and a transition of the slave instance to the slave suspend state is not desired. In this context, the signal is operative to prevent the master instance from switching the bus into the bus suspend state.

BRIEF DESCRIPTION OF THE DRAWINGS

Embodiments of the present invention will be detailed subsequently referring to the appending drawings, in which.

DETAILED DESCRIPTION

Figure 1A:
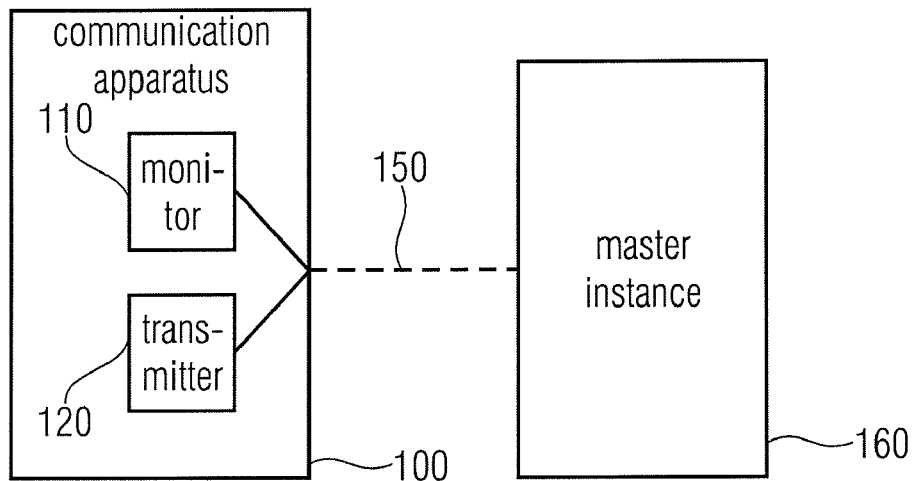
FIG. 1a is an embodiment of a communication apparatus.

Before embodiments of the present invention will be explained in more detail in the following with reference to the drawings, it should be understood that same elements in the Figures are provided with same or similar reference numerals and that a repeated description of these elements is omitted.

When a master instance transmits a suspend signal to a slave instance during a data transmission, a simple mechanism may be found with which the slave instance can be prevented from being placed at an idle state so as to prevent an undesirable interruption of processing in the slave instance. This case occurs, for example, when the slave instance has data for transmitting during processing, but has not transmitted any data over a certain period, such as the period of 8 bits in the SWP. The slave instance may then, even before obtaining the idle state signalization, transmit a bit sequence to the master instance, which is not interpreted by the master instance as a valid frame in terms of a control information of the protocol, such as SWP, yet at the same time prevents the master instance from entering the idle state or the suspend modus and, thus, delays a step into the idle state or the suspend modus. The idle state signalization may correspond, for example, to an inactivity over a duration of 8 bit periods.

Thus, embodiments go without a signalization of superordinated protocols since in the embodiment of the SWP, for example, communication may be made directly via the SWP. In one embodiment, the slave instance transmits, prior to achieving the idle state, a signal which may be simply and quickly processed by the master instance, which may be processed in the hardware by recognition, for example, so that no software interaction is needed in this embodiment for realizing a delay of the idle state. In one embodiment, the signal may comprise a bit sequence, which is not interpreted by the master instance as a valid frame or a valid control information, yet at the same time prevents the master instance from entering the idle state and, thus, delays this step.

For example, the slave instance recognizes the "threatening" suspend modus of the bus and establishes that a processing in process has not yet been completed. Before time lapse of the interval leading to the suspend of the bus, any signal is transmitted to the master, which is recognized by it as "communication" on the bus and prevents switching the bus into the suspend state. After receipt of the signal (that is, after completion of communication), the master will again monitor the bus for activity, so that the signal is sent from the slave instance until the processing is completed. The data may then be transmitted as usual, and the master instance subsequently may place the bus at the suspend modus if the slave instance has no further processing to perform.

FIG. 1a shows an embodiment of a communication apparatus 100 for communication according to a master-slave communication protocol. The communication apparatus 100 is formed as a slave instance communicating with a master instance 160 via a bus 150, with the master instance 160 being operative to switch the bus 150 into a bus suspend state if no bus activity is present during a predetermined interval, and with the slave instance making a transition to a slave suspend state in response to a bus suspend state. Communication apparatus 100 further includes a monitor 110 for monitoring the bus activity and a transmitter 120 for transmitting a signal via the bus 150 if the monitor 110 does not recognize any bus activity during part of the predetermined interval and a transition of the slave instance to the slave suspend state is undesirable. In this context, the signal is operative to prevent the master instance 160 from switching the bus 150 into the bus suspend state.

In one embodiment, the predetermined interval may include a predetermined number of portions or bits. The communication protocol may be the SWP (Single Wire Protocol), for example. The means 120 may further be formed to transmit the signal before the last portion or bit at the latest, and in one example, the signal may only comprise a logical "1". In further embodiments, the slave instance terminates data processing in the slave suspend state and, thus, the slave suspend state then corresponds to a state in which no data processing is performed but generally, also other embodiments are conceivable.

For example, the slave instance may watch the SWP bus and, if it realizes that there has not been any activity on the bus for a duration of 7 bits, transmit a bit sequence upon the $8^{th}$ bit, which begins with a logical "1", for example, and contains a logical "1" at least every eight time portions or bit lengths. In one embodiment, this tag does not correspond to any established tag of the SWP, such as a tag for "Start of Frame" or "End of Frame". In terms of the SWP, the slave instance could, upon the $8^{th}$ bit, for example, transmit a logical "1" followed by 7 logical "0" until finally the slave instance, i.e. the communication apparatus 100, too, is ready to enter the idle state or until the master instance starts a new communication in the form of a data frame transmission.

For energy-saving reasons, the signal may, for example, comprise only one logical "1", since in the field of the SWP, each logical "1" may cause power consumption. In general, however, the signal may as well comprise several "1"s. In one embodiment, eight "0" bits are provided as the suspend interval, and the signal is transmitted upon the seventh bit at the latest, but generally, a transmission may take place also earlier.

In a further embodiment, the slave instance could transmit, upon the $8^{th}$ bit, an empty frame, i.e. a tag for "Start of Frame" followed by a tag for "End of Frame" followed by seven "0", until it is ready to enter the idle state. In a further embodiment, the slave instance could transmit, upon the $7^{th}$ bit, an "End of File" until either a readiness for the idle state is achieved or a new communication is started. For example, a logical "1" followed by seven logical "0" does not represent any start or end signalization provided in the bus protocol of the SWP. Accordingly, this tag can be interpreted as a bit error in the bus protocol and is not understood as a datastream. If known tags are used, such as in the embodiment using the tags "Start of Frame" or "End of Frame", the master instance may, for example, in the embodiment of the SWP, change into an error state, which, as a further consequence, results in an interaction of the software within the master instance. Embodiments using a tag interpreted as bit errors in the bus may, for this reason, be advantageous.

Figure 1B:
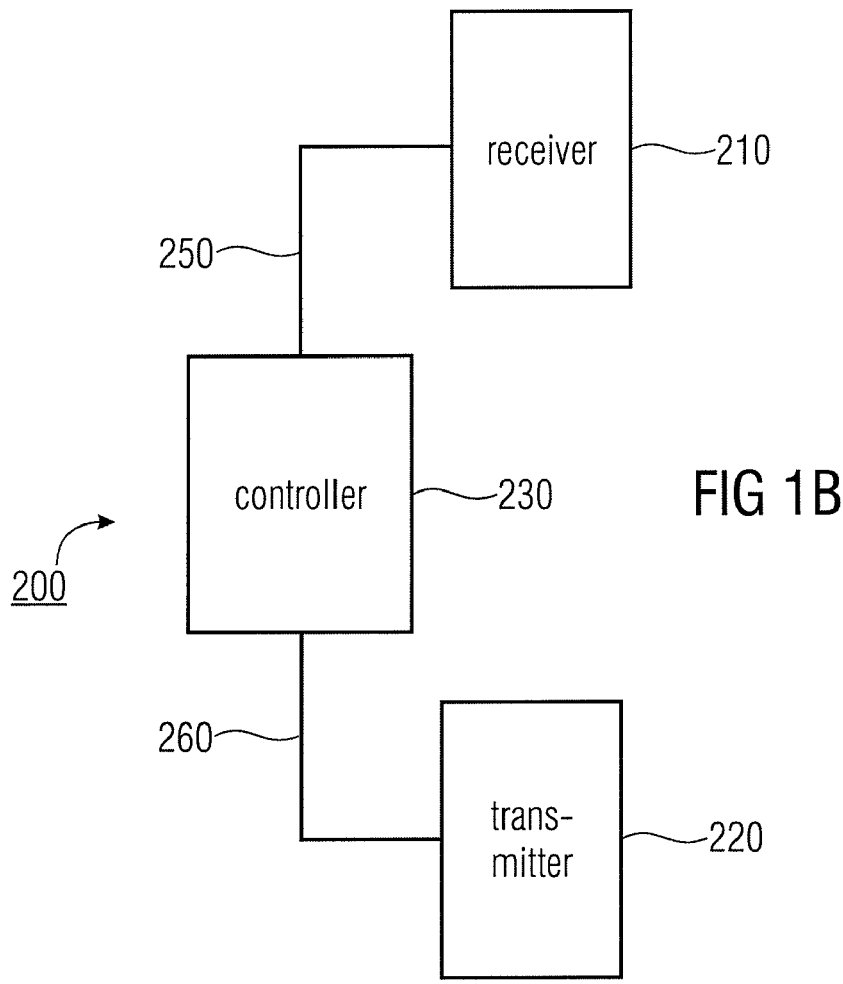
FIG. 1b is a further embodiment of a communication circuit.

FIG. 1b shows an embodiment of a communication circuit 200 with a receiver 210 and a transmitter 220 which are connected to a bus 250. The communication circuit 200 further includes a controller 230 with a bus signal input connected to the receiver 210 and with a signal output 260 for a signal, which is connected to the transmitter 220, at which a signal is present in response to no signal being present at the bus signal input for part of the predetermined interval and in response to a transition of the communication circuit into a suspend state being undesirable.

In one embodiment, also sequences of logical "0" or zero-signal levels, for example, are transmitted on the bus within the frame of a data transmission. The state in which no signal is present at the bus signal input for part of a predetermined interval then includes that no data transmission takes place during this interval. In terms of these embodiments, transmitting a zero word during a data transmission is not to be equated with an inactivity of the bus.

In one embodiment, the receiver 210 and the transmitter 220 may operate or be formed according to the SWP (Single Wire Protocol). The communication circuit 200 may be coupled to a further communication circuit comprising a controller generating, in response to the signal, a control signal preventing the further communication circuit from switching the bus 250 into a bus suspend state. In one embodiment, the predetermined interval includes a predetermined number of portions or bits. The transmitter may be formed to transmit the signal before the last portion or bit at the latest. For example, the signal may comprise only one logical "1". In this context, embodiments may deploy the embodiments of signals already mentioned above, such as a logical "1" followed by seven logical "0" s, for an SWP, for example.

Figure 2:
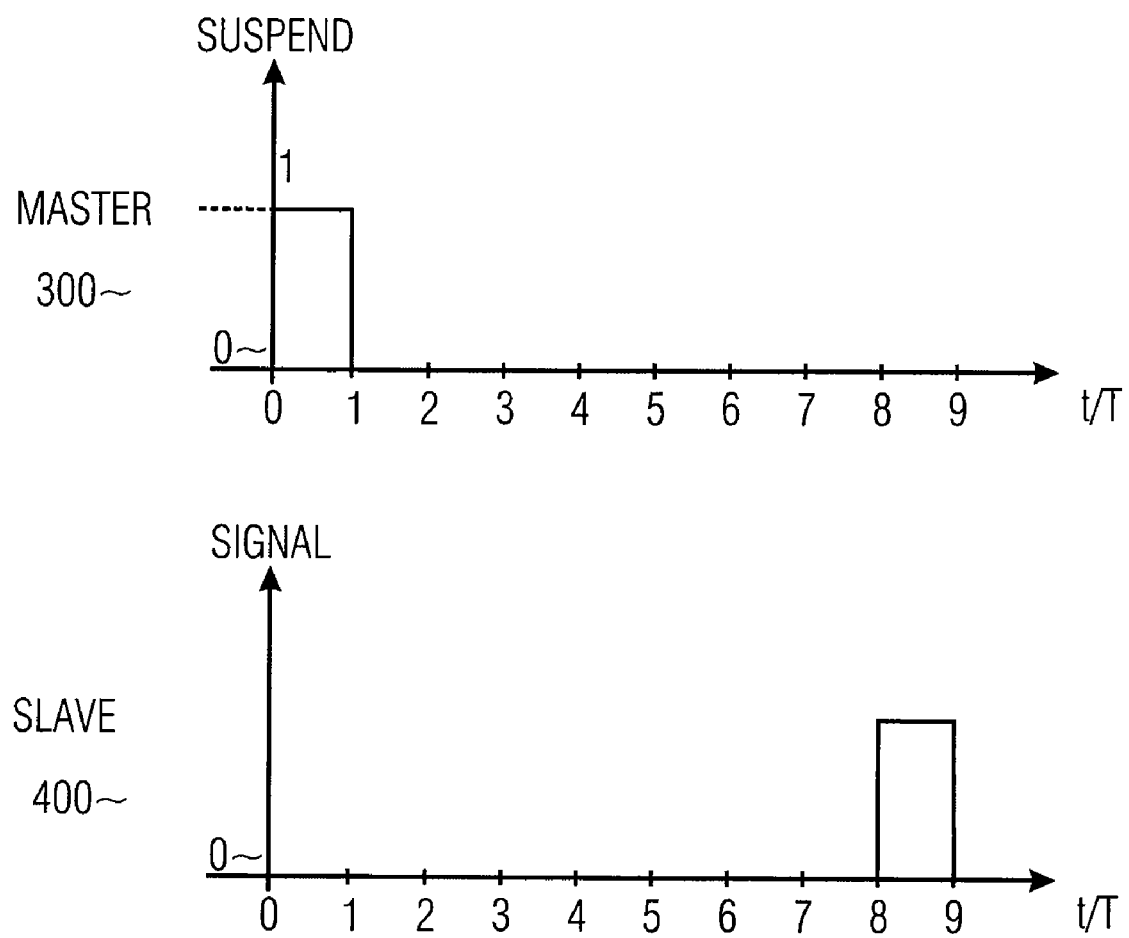
FIG. 2 shows two signal profiles for explanation of the embodiments of a method.

FIG. 2 shows exemplary profiles of a suspend signal 300 and a signal 400 of an embodiment. In FIG. 2, it is assumed that a master instance transmits a suspend signal 300 to a slave instance. It is assumed that the slave instance is not ready to enter a idle state, whereupon it transmits a signal 400 even before the suspend signal 300 has completely been received. In other words, in the embodiment of FIG. 2, the slave instance does not wait for the complete suspend signal 300, but timely transmits the signal 400 signaling, to the master instance, an activity on the bus, of the SWP, for example.

In the embodiment of FIG. 2, the suspend signal 300 corresponds to an inactivity of the bus for eight symbol durations T, which begins at time t=T. After the slave instance has not detected any activity on the bus for seven symbol durations T but is not ready to change into the suspend state, it transmits, at time t=8 T, the "1" signal according to the signal profile 400 of the slave instance in FIG. 2.

Thus, embodiments allow, within a protocol level, such as SWP, to delay an entry into a idle state if it is foreseeable, from the perspective of a slave instance, that a data processing in process cannot be terminated.

In particular, it should be understood that depending on the circumstances, the embodiments may also be implemented in software. The implementation may occur on a digital storage medium, in particular, a disc, a CD or a DVD with electronically readable control signals, which interact with a programmable computer system, such that the corresponding method is executed. Generally, the embodiments may thus be also realized as a computer program product with a program code stored on a machine-readable carrier for performing the corresponding method when the computer program product runs on a computer. In other words, the embodiments may thus be realized as a computer program having a program code for performing the method when the computer program product runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A slave communication apparatus, comprising:
   a transmitter configured to transmit signals via a bus to a master instance in accordance with a master-slave communication protocol, wherein in accordance with the master-slave communication protocol the master instance is operative to switch the bus into a bus suspend state if no bus activity is present during a first predetermined interval, the slave communication apparatus being operative to enter a slave suspend state in case the bus is placed into the bus suspend state; and
   a monitor configured to monitor the bus activity and to cause transmission of a signal over the bus in case there was no activity on the bus during a second predetermined interval and a transition of the slave communication apparatus to the slave suspend state is undesirable, the second predetermined interval being shorter than the first predetermined interval,
   wherein the signal is operative to prevent the master instance from switching the bus into the bus suspend state.

2. The slave communication apparatus according to claim 1, wherein the first predetermined interval includes a predetermined number of portions or bits.

3. The slave communication apparatus according to claim 2, wherein the transmitter is configured to transmit the signal at the penultimate portion or bit at the latest.

4. The slave communication apparatus according to claim 1, wherein the transmitter is configured to repeat the signal until a transition of the slave communication apparatus to the slave suspend state is desirable or another bus activity takes place.

5. The slave communication apparatus according to claim 1, wherein the signal comprises only one logical "1".

6. The slave communication apparatus according to claim 1, wherein the slave communication apparatus terminates data processing in the slave suspend state.

7. The slave communication apparatus according to claim 1, wherein the communication protocol is the SWP (Single Wire Protocol).

8. A slave communication circuit, comprising:
   a receiver;
   a transmitter configured to transmit signals via a bus to a master instance in accordance with a master-slave communication protocol, wherein in accordance with the master-slave communication protocol the master instance is operative to switch the bus into a bus suspend state if no bus activity is present during a first predetermined interval, the slave communication apparatus being operative to enter a slave suspend state in case the bus is placed into the bus suspend state, the receiver and the transmitter being connected to the bus; and
   a controller comprising:
       a bus signal input connected to the receiver, and
       a signal output connected to the transmitter,
   wherein the controller is configured to monitor the bus signal input for a bus activity and to provide at the signal output a signal for transmission over the bus in case there was no activity on the bus during a second predetermined interval and a transition of the slave communication apparatus to the slave suspend state is undesirable, the second predetermined interval being shorter than the first predetermined interval, and
   wherein the signal is operative to prevent the master instance from switching the bus into the bus suspend state.

9. The slave communication circuit according to claim 8, wherein the controller is configured to apply the signal to the signal output in response to no signal being present at the bus signal input for the second predetermined interval, no data transmission being made and a transition of the communication circuit to a suspend state being not desirable.

10. The slave communication circuit according to claim 8, wherein the receiver and the transmitter operate according to the SWP (Single Wire Protocol).

11. The slave communication circuit according to claim 8, wherein the bus is coupled to a further communication circuit comprising a controller configured to generate, in response to the signal, a control signal preventing the further communication circuit from switching the bus into a bus suspend state.

12. The slave communication circuit according to claim 8, wherein the first predetermined interval includes a predetermined number of portions or bits.

13. The slave communication circuit according to claim 12, wherein the transmitter is configured to transmit the signal before the last portion or bit at the latest.

14. The slave communication circuit according to claim 8, wherein the signal comprises only one logical "1".

15. The slave communication circuit according to claim 8, which terminates data processing in the suspend state.

16. A method for communication in accordance with a master-slave communication protocol between a slave instance and a master instance, the method comprising:
   transmitting signals via a bus to a master instance in accordance with a master-slave communication protocol, wherein in accordance with the master-slave communication protocol the master instance is operative to switch the bus into a bus suspend state if no bus activity is present during a first predetermined interval, the slave communication apparatus being operative to enter a slave suspend state in case the bus is placed into the bus suspend state;
   monitoring, by a slave instance, the bus activity; and
   transmitting, by the slave instance, a signal over the bus in case there was no activity on the bus during a second predetermined interval and a transition of the slave instance to the slave suspend state is undesirable, the second predetermined interval being shorter than the first predetermined interval, wherein the signal is operative to prevent the master instance from switching the bus into the bus suspend state.

17. The method according to claim 16, wherein the first predetermined interval includes a predetermined number of portions or bits.

18. The method according to claim 17, wherein the signal is transmitted before the last portion or bit at the latest.

19. The method according to claim 16, wherein the signal comprises only one logical "1".

20. The method according to claim 16, wherein the slave instance terminates data processing in the slave suspend state.

21. The method according to claim 16, wherein the communication protocol is the SWP (Single Wire Protocol).

22. A digital storage medium comprising a computer program with a program code for performing a method for communication in accordance with a master-slave communication protocol between a slave instance and a master instance, when the program code is executed on a computer the method comprising:

transmitting signals via a bus to a master instance in accordance with a master-slave communication protocol, wherein in accordance with the master-slave communication protocol the master instance is operative to switch the bus into a bus suspend state if no bus activity is present during a first predetermined interval, the slave communication apparatus being operative to enter a slave suspend state in case the bus is placed into the bus suspend state;

monitoring, by a slave instance, the bus activity; and transmitting, by the slave instance, a signal over the bus in case there was no activity on the bus during a second predetermined interval and a transition of the slave instance to the slave suspend state is undesirable, the second predetermined interval being shorter than the first predetermined interval, wherein the signal is operative to prevent the master instance from switching the bus into the bus suspend state.

\* \* \* \* \*